United States Patent
Conley et al.

(10) Patent No.: US 6,328,191 B1
(45) Date of Patent: Dec. 11, 2001

(54) STORAGE ASSEMBLY WITH CLOSURE DEVICE

(75) Inventors: Robert W. Conley, Plymouth; Dudley E. Schmidt, Lincoln Park, both of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/454,632

(22) Filed: Dec. 6, 1999

(51) Int. Cl.⁷ ............................................. B60R 7/00
(52) U.S. Cl. ................... 224/563; 224/235; 224/539; 224/543; 150/130; 383/43
(58) Field of Search .................... 224/539, 275, 224/235, 563, 483, 311, 312, 543, 567; 190/106, 127; 150/128, 130, 147; 383/43, 33

(56) References Cited

U.S. PATENT DOCUMENTS

| | | | |
|---|---|---|---|
| 1,224,842 | * 5/1917 | Boyd | 2/252 |
| 1,310,869 | * 7/1919 | McHugh | 383/43 |
| 1,658,294 | * 2/1928 | Lewis | 150/150 |
| 1,715,702 | * 6/1929 | Gordon | 224/543 |
| 1,887,265 | 9/1932 | Chadwick . | |
| 1,995,143 | 3/1935 | Burch . | |
| 2,024,884 | 12/1935 | Schlegel . | |
| 2,084,757 | * 6/1937 | Alter | 383/34 |
| 2,158,955 | * 5/1939 | Blacher | 24/30.5 R |
| 2,453,843 | * 11/1948 | Hanson | 224/539 |
| 3,272,248 | * 9/1966 | O'Farrell | 383/43 |
| 5,009,458 | 4/1991 | Shute . | |
| 5,037,138 | * 8/1991 | McClintock et al. | 383/34 |
| 5,261,716 | 11/1993 | Phelps . | |
| 5,383,727 | 1/1995 | Rife . | |
| 5,499,853 | 3/1996 | Pourian . | |

* cited by examiner

*Primary Examiner*—Stephen K. Cronin

(57) ABSTRACT

A storage assembly for a vehicle including an outer panel having a lower portion and an upper portion, and a closure device. The lower portion of the outer panel is attachable to an inner panel to define a storage pocket. The upper portion is deflectable from the inner panel to define an aperture of the storage pocket. The closure device has an arcuate shape and a convex side. The closure device is fastened to the upper portion of the outer panel with the convex side facing the inner panel such that the closure device urges the upper portion against the inner panel. This force by the closure device helps define the closed position as the "normal" or "relaxed" position of the storage assembly. The force of the closure device can be overcome by a user of the storage assembly to move the outer panel into an open position, which would allow insertion or removal of objects from the storage pocket.

14 Claims, 2 Drawing Sheets

STORAGE ASSEMBLY WITH CLOSURE DEVICE

TECHNICAL FIELD OF THE INVENTION

This invention generally relates to storage assemblies for a vehicle. More specifically, this invention relates to storage assemblies that include closure devices movable from a closed position to an open position.

BACKGROUND

Nearly since the dawn of the automobile, map pockets have been attached to an interior component of the vehicle and used to store objects such as tissues, paper, pencils, and, of course, maps. Over the years, the map pocket has evolved, and at times has incorporated a closure device made from elastic materials, which arc relatively flimsy, and metal components, which arc relatively expensive. The need for a sturdy, durable, and relatively inexpensive closure device has existed, but until now has not been met.

SUMMARY OF THE INVENTION

Accordingly, this invention provides for a storage assembly and a closure device which overcomes the problems and disadvantages of the conventional techniques in the art. The invention also provides for a closure device that is sturdy, durable, and relatively inexpensive.

Briefly, the invention includes a storage assembly for a vehicle including an outer panel having a lower portion and an upper portion, and a closure device. The lower portion of the outer panel is attachable to an inner panel to define a storage pocket. The upper portion is deflectable from the inner panel to define an aperture of the storage pocket. The closure device has an arcuate shape and a convex side. The closure device is fastened to the upper portion of the outer panel with the convex side facing the inner panel such that the closure device urges the upper portion against the inner panel. This force by the closure device helps define the closed position as the "normal" or "relaxed" position of the storage assembly. The force of the closure device can be overcome by a user of the storage assembly to move the outer panel into an open position, which would allow insertion or removal of objects from the storage pocket.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention, or its application or uses.

Figure 1:
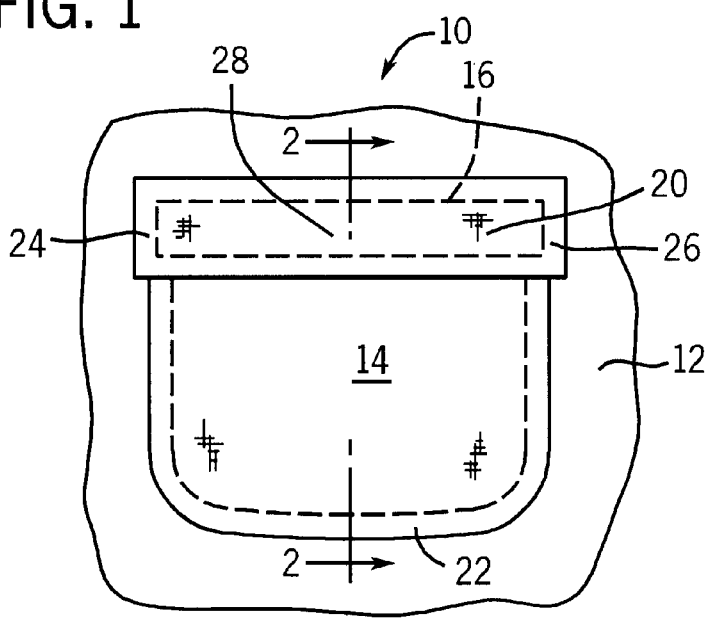
FIG. 1 is an elevation view of the storage assembly according to a preferred embodiment of the invention.
Figure 2:
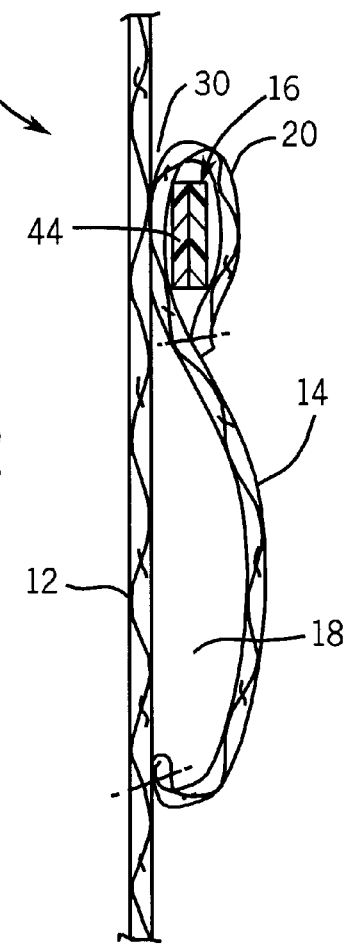
FIG. 2 is a cross-sectional view taken along the line 2—2 in FIG. 1.

As shown in FIGS. 1 and 2, the storage assembly 10 of the invention includes an inner panel 12, an outer panel 14, and a closure device 16. The inner panel 12 and the outer panel 14 are attached to define a storage pocket 18, which can be used to store objects such as maps, tissues, paper, and pencils.

The inner panel 12 functions to provide the structure for the storage assembly 10. In the preferred embodiment of the invention, the inner panel 12 is a trim cover for an interior component of a vehicle. The inner panel 12 may be a trim cover for the rear side of a seat back or the front side of a scat cushion, a trim cover for a door panel, a trim cover for an overhead console, or a trim cover for any other interior component. In an alternative embodiment of the invention, the inner panel 12 may be a separate component from the trim cover. In other words, the inner panel 12 and the outer panel 14 may form a two-panel pouch that can be attached to the exterior surface of a trim cover, or can be attached to the interior surface of a trim cover with a slit in the trim cover to provide access to the storage assembly 10.

The outer panel 14 functions to contain objects placed within the storage pocket 18. In the preferred embodiment of the invention, the outer panel 14 is made from a flexible material, such as pleated leather or woven fabrics. The outer panel 14 may be made from a mesh material, which not only flexes but also allows a partial view of the objects placed within the storage pocket IS. The outer panel 14 includes an upper portion 20 and a lower portion 22. The lower portion 22 of the outer panel 14 is attached to the inner panel 12. As can be appreciated by a skilled person in the art, the inner panel 12 and the outer panel 14 may be constructed from one continuous material. In this alternative arrangement, the upper portion 20 of the outer panel 14 may be attached to a trim cover and the lower portion 22 may either be draped over the exterior surface, may be attached to the exterior surface, or may be attached to the interior surface of the trim cover.

The upper portion 20 of the outer panel 14 includes two end sections 24 and 26, and a middle section 28. Both end sections 24 and 26 are attached to the inner panel 12, which anchors the upper portion 20 of the outer panel 14 and supports the storage assembly 10. The middle section 28 is deflectable from a closed position against the inner panel 12 to an open position at a distance from the inner panel 12. In the open position, objects may be placed within the storage pocket 18, while in the closed position the objects are contained. By deflecting from the closed position to the open position, the middle section 28 of the upper portion 20 defines an aperture 30 for the storage pocket 18.

Figure 3:
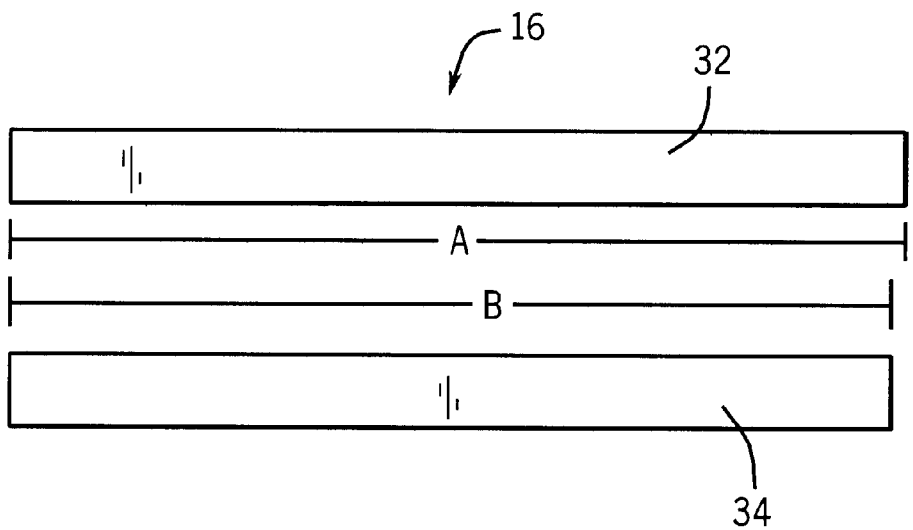
FIG. 3 is an elevation view of the first strip and the second strip that combine to from the closure device according to the preferred embodiment of the invention.
Figure 4:
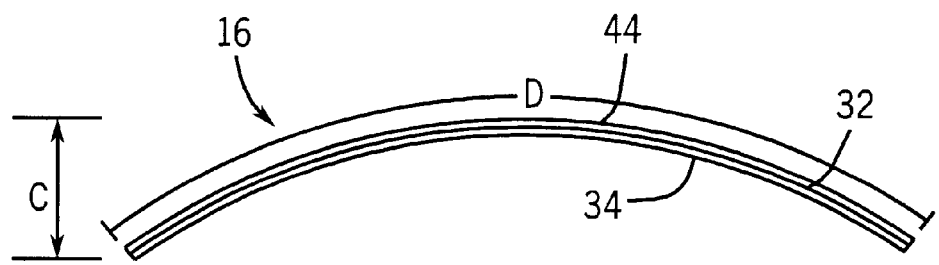
FIG. 4 is a top-view of the closure device.

As shown in FIGS. 3 and 4, the closure device 16 includes a first strip 32 and a second strip 34. Both the first strip 32 and the second strip 34 are formed in a generally planar shape from a resilient material. The first strip 32 and the second strip 34, however, are fastened to each other such that the closure device 16 has an actuate shape, and preferably a curve shape. This arcuate arrangement is preferably obtained by fastening the first strip 32 and the second strip 34 together while maintaining an arcuate shape.

Based on the simple fact that the first strip 32 is located further from the focal point of the arcuate shape than the second strip 34, the first strip 32 has a longer length than the second strip 34 for a given arc length D. In the preferred arcuate arrangement of the closure device 16, the first strip 32 has a first length A equal to about 100.5% of the second length B of the second strip 34. Although the first strip 32 and the second strip 34 differ in size, the first edges 36 and 38 of the first strip 32 are in a flush arrangement with the second edges 40 and 42 of the second strip 34 because of the arcuate shape of the closure device 16. The closure device 16 has a relaxed bow height C equal to at least 5%, and preferably about 10% to 20%, of the first length A.

As can be appreciated by a skilled person in the art, the preferred arcuate arrangement can be obtained with strips that are not originally planar, strips that differ in size by an amount greater or lesser than 0.5%, strips that are not in a flush arrangement, and strips that have a relaxed bow height less than 5% or greater than 20% of the length of the strips. In each of the embodiments of the invention, however, the closure device 16 has an arcuate shape.

In the preferred embodiment, the first strip 32 and the second strip 34 are made from a plastic material, but other materials with suitable resilient properties may be used. Further, the first strip 32 and the second strip 34 are preferably fastened together with durable thread, but other fastening methods, such as mechanical, thermal, or chemical bonds, may be used.

As shown in FIGS. 1, 2, and 4, the closure device 16 is fastened to the upper portion 20 of the outer panel 14 with a convex side 44 of the closure device 16 facing the inner panel 12. In the preferred embodiment, the upper portion 20 is fastened over the closure device 16 along the length of the closure device 16, but in alternative embodiments, the upper portion 20 may form an elongated cavity for the insertion of the closure device 16. Since the upper portion 20 has a generally planar shape in the closed position, and a generally arcuate shape with an opposite curvature in the open position, the arcuate shape and the resilient properties of the closure device 16 function to urge the middle section 28 of the upper portion 20 against the inner panel 12 and into the closed position. This force by the closure device 16 helps define the closed position as the "normal" or "relaxed" position of the storage assembly 10. The force of the closure device 16 can, of course, be overcome by a user of the storage assembly 10 to move the outer panel 14 into the open position, which would allow insertion or removal of objects from the storage pocket 18.

The foregoing discussion discloses and describes a preferred embodiment of the invention. One skilled in the art will readily recognize from Such discussion, and from the accompanying drawings and claims, that changes and modifications can be made to the invention without departing from the true spirit and fair scope of the invention as defined in the following claims.

We claim:

1. A storage assembly for a vehicle, comprising:

an outer panel having a lower portion and an upper portion, said lower portion being attachable to an inner panel to define a storage pocket, said upper portion having end sections and a middle section, said end sections being attachable to the inner panel and said middle section being deflectable from the inner panel to define a closed position for said storage pocket; and a closure device having an arcuate shape and a convex side and being fastened to said upper portion such that said convex side faces the inner panel and that said closure device urges said middle portion of said upper portion against the inner panel and into a closed position, wherein said closure device includes a first strip and a second strip, said second strip being fastened to said first strip.

2. The storage assembly of claim 1 wherein the arcuate shape of the closure device is a curve shape.

3. The storage assembly of claim 1 wherein said first strip has a first strip length, and said closure device has a relaxed bow height equal to at least 5% of the first strip length.

4. The storage assembly of claim 3 wherein closure device has a relaxed bow height equal to at least 10% of the first strip length.

5. The storage assembly of claim 4 wherein said closure device has a relaxed bow height in the range of about 10% to 20% of the first strip length.

6. The storage assembly of claim 1 wherein said first strip has a first strip length, and said second strip has a second strip length equal to at least 100.5% of the first strip length.

7. The storage assembly of claim 6 wherein said first strip has first strip edges, and said second strip has second strip edges in a flush arrangement with said first strip edges.

8. A closure device for a storage pocket, comprising a first strip having a generally planar shape, and a second strip having a generally planar shape, said second strip being fastened to said first strip to form an arcuate shape, said first strip and said second strip being fastenable to an outer panel of the storage pocket to urge the outer panel against an inner panel of the storage pocket.

9. The closure device of claim 8 wherein the arcuate shape is a curve shape.

10. The closure device of claim 8 wherein said first strip has a first strip length, and said closure device has a relaxed bow height equal to at least 5% of the first strip length.

11. The closure device of claim 10 said closure device has a relaxed bow height equal to at least 10% of the first strip length.

12. The closure device of claim 11 wherein said closure device has a relaxed bow height in the the range of about 10% to 20% of the first strip length.

13. The closure device of claim 8 wherein said first strip has a first strip length, and said second strip has a second strip length equal to at least 100.5% of the first strip length.

14. The closure device of claim 13 wherein said first strip has first strip edges, and said second strip has second strip edges in a flush arrangement with said first strip edges.

* * * * *